June 6, 1944.     H. J. TROCHE ET AL     2,350,841
WRECK TRAILER
Filed Nov. 12, 1941     2 Sheets-Sheet 1
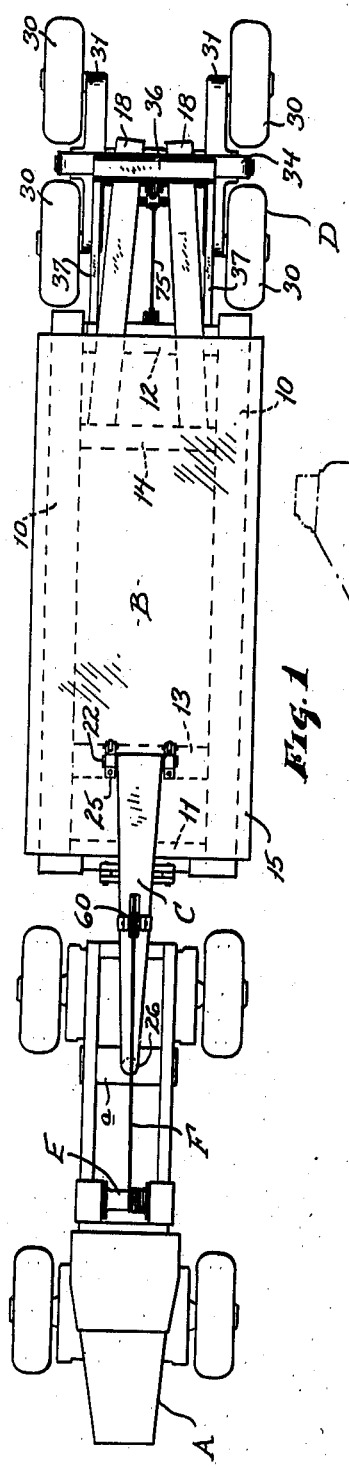
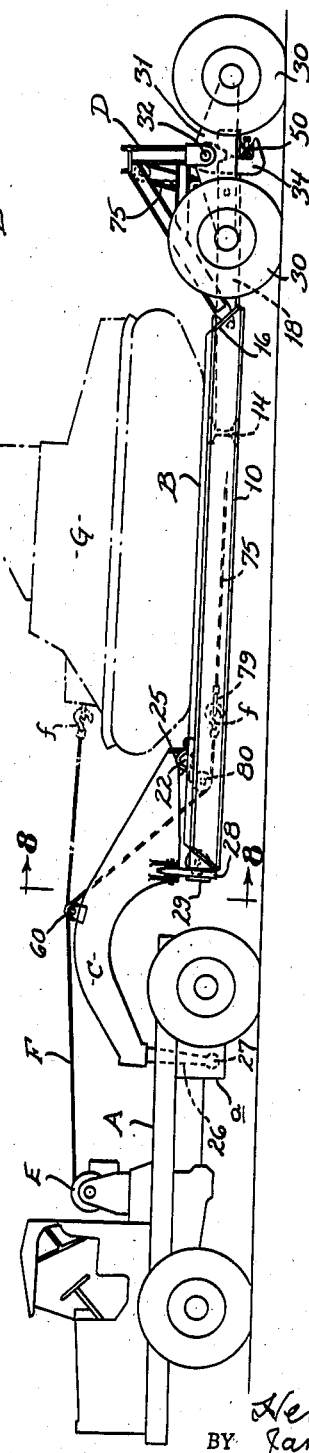
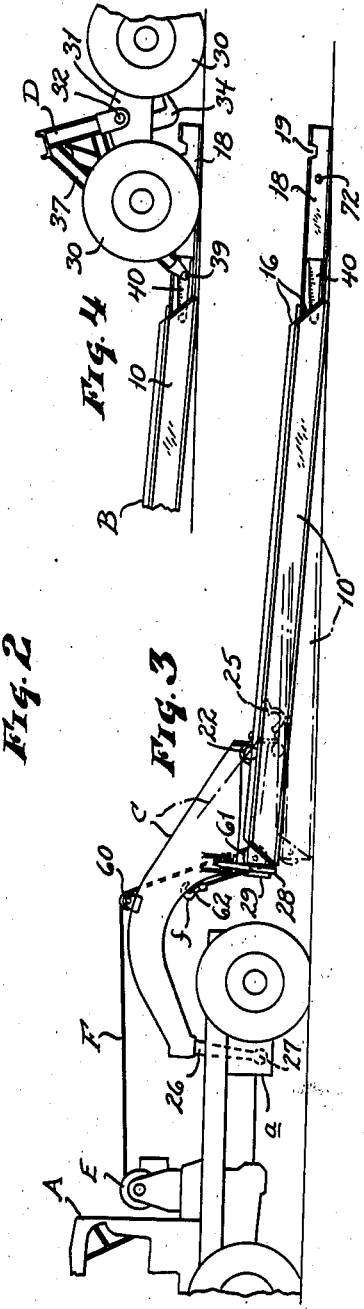
INVENTORS:
Herman J. Troche and
BY James H. Holan, Jr.
Bates, Teare & McDean
Attorneys June 6, 1944. H. J. TROCHE ET AL 2,350,841
WRECK TRAILER
Filed Nov. 12, 1941 2 Sheets-Sheet 2
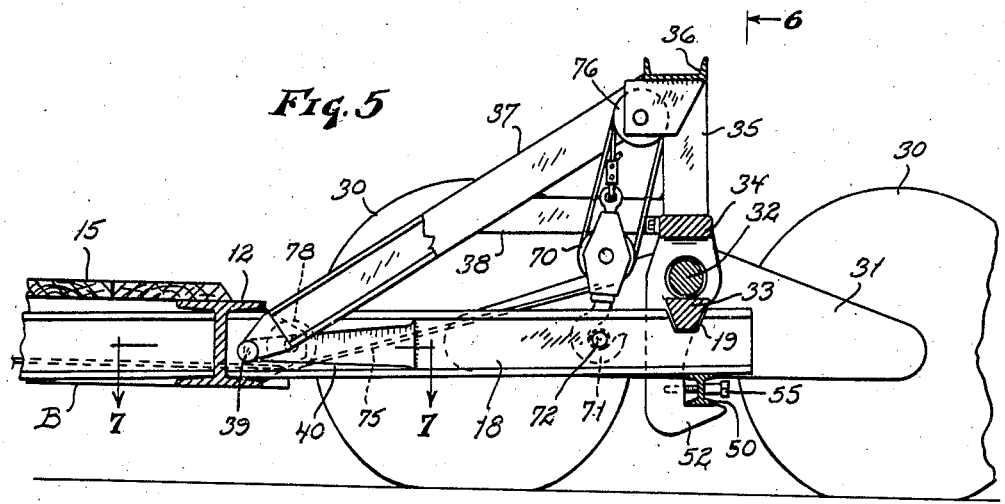
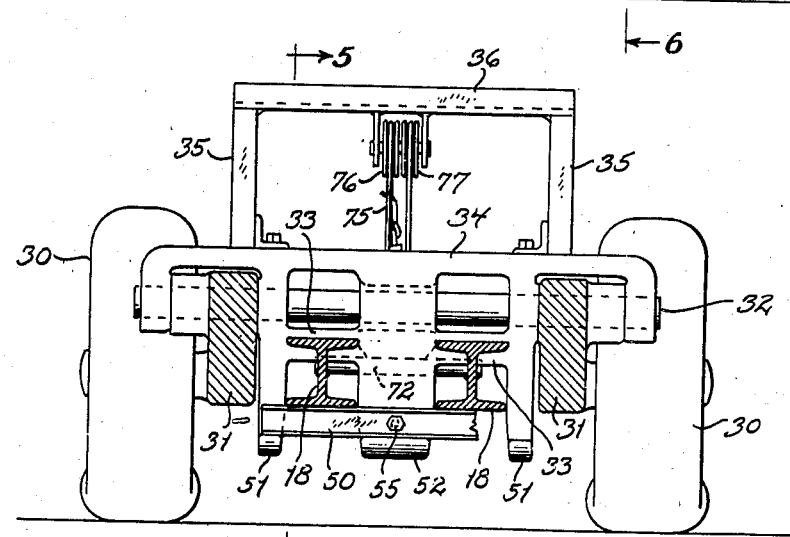
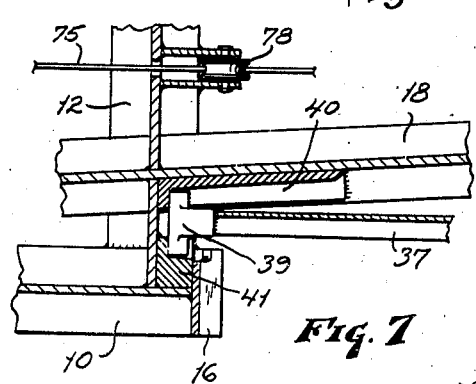
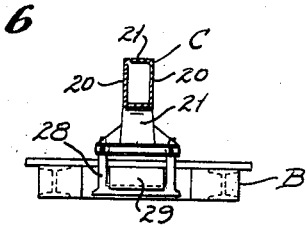
INVENTORS:
Herman J. Troche and
BY James H. Holan, Jr.
Bates, Teare & McBean
Attorneys.

Patented June 6, 1944

2,350,841

UNITED STATES PATENT OFFICE 2,350,841

WRECK TRAILER

Herman J. Troche, Cleveland Heights, and James H. Holan, Jr., Lakewood, Ohio, assignors to The American Coach & Body Company, Cleveland, Ohio, a corporation of Ohio Application November 12, 1941, Serial No. 418,768

11 Claims. (Cl. 280—33)

This invention relates to a vehicle adapted to be propelled on a highway and having provision whereby it may be lowered to the ground so that the load may be readily mounted above it. The vehicle is in the form of a trailer adapted to be drawn by a suitable tractor and comprises a platform to support the load, means connecting the front end thereof to the tractor and a wheeled support for the rear end.

Our invention is particularly concerned with the support at the rear end of the platform and the operation thereof to raise and lower such rear end, the front end of the platform being supported by the tractor in any suitable manner to allow the rear end of the platform to swing up and down and to allow the tractor to turn with reference to the trailer. Our invention also provides means whereby the power of the tractor may be employed to raise the rear end of the platform and to control the lowering thereof.

The invention is well adapted for carrying wrecked or disabled automotive devices, as, for example, an army tank. The platform is supported at its rear end by a detachable truck behind the platform, with the result that the rear end may be lowered to the ground and the truck removed at a distance from the platform so that the load may be drawn or forced onto the platform. Then the truck may be re-connected to the platform and the latter raised into a running position by cables and pulleys operated by a winch on the tractor.

The invention is hereinafter more fully explained in connection with the embodiment illustrated in the drawings.

In the drawings, Fig. 1 is a plan of the trailer attached to the tractor; Fig. 2 is a side elevation of the same, showing in broken lines an army tank positioned on the platform; Fig. 3 is a side elevation of a portion of the tractor and the platform lowered at the rear, the supporting truck having been removed; Fig. 4 is a side elevation of the supporting truck, the rear portion of the platform having been lowered to the ground and the truck partially removed; Fig. 5 is a longitudinal section on a larger scale of the rear portion of the trailer in operating position, the section being taken on the line 5—5 of Fig. 6; Fig. 6 is a transverse vertical section on a line 6—6 of Fig. 5; Fig. 7 is a detail in sectional plan of the trailer, as indicated by the line 7—7 on Fig. 5; Fig. 8 is a detail, in front elevation of the supporting connection at the front of the platform, being a vertical section on the line 8—8 in Fig. 2.

Referring to Figs. 1 to 4, A indicates a suitable four-wheeled tractor; B, the platform of the trailer; C, the bracket connecting it with the tractor; D, the truck which supports the rear end of the platform; E, indicates a winch or a cable-winding drum adapted to be operated by the power of the tractor. From this winch a cable F extends rearwardly which may be employed to draw the load onto the lowering platform (as indicated by the attachment to the army tank G, Fig. 2). This same cable, as hereinafter explained may be employed to control the lowering of the rear end of the platform or to raise such end after it has been lowered, and the load drawn onto it.

The platform B is shown as made up of a pair of longitudinal I-beams or side sills 10 and cross beams or end sills 11 and 12, intermediate cross beams 13 and 14 and suitable flooring 15. The rear end of the platform is beveled, as indicated at 16 to make a gradual runway to the top of the platform.

The bracket C, connecting the platform to the trailer, comprises a strong goose-neck member which may be a hollow girder composed of side plates 20 and top and bottom plates 21. This member may have projecting trunnions 22 at the rear end which are adapted to rest in seats on the platform and be overlapped by hinged retaining plates 25 so that the bracket at its rear end is removable pivoted to the platform. At its front end the bracket shown has a downwardly extending leg 26 formed with a ball 27 at the lower end, which is adapted to rest in a spherical socket in a crossbeam $a$ on the tractor. Extending downwardly from the bracket is a stirrup 28 adapted to embrace a projecting bar 29 on the front end of the platform, when elevated, as shown in Fig. 2. The construction just described, and shown in Figs. 2, 3 and 8, which enables the front end of the platform to be lowered to the ground (as indicated in the broken lines in Fig. 3) may, or may not, be employed as desired, in connection with our invention at the rear of the platform, which we will now describe.

At its rear end, the platform frame has a pair of converging rearwardly projecting cantilever beams 18, preferably I-beams, which are secured at their front ends to the cross beams 14, and intersect the end sill 12. Preferably the webs of the cantilever beams are welded to the web of this end sill, as indicated in Fig. 7. These extension beams 18 provide the means for attaching the supporting truck D, as about to be explained.

The supporting truck D comprises four wheels 30 mounted on stub axles projecting outwardly

shoulders and guideways being adapted to be brought into engagement when the rear end of the platform is resting on the ground, and mechanism for raising the rear end of the platform and allowing the shoulders on the frame to slide along the guideways.

3. The combination of a trailer platform, free at its rear end to be raised or lowered, the platform having a rear extension, a removable truck behind the platform adapted to coact with the extension, said truck carrying a rockable frame, means for connecting the frame to the platform, said rockable frame being provided with a downwardly extending hook adapted to project below the extension of the platform when raised, and a removable cross bar adapted to lie between the hook and extension and latch the platform in its elevated position.

4. The combination of a platform pivotally mounted and adapted to move up and down at the rear end, a pair of extension beams at the rear end of the platform, a removable wheeled truck adapted to stand at the rear of the platform with its wheels at the outer sides of the extension beams, said truck carrying a pivotally mounted frame, means on the platform for slidably receiving laterally spaced shoulders on the forward end of said frame, cable lifting mechanism having a sheave on said frame and adapted to engage the extension beams, whereby the extension beams may be raised, and means on the rockable frame adapted to interlock with the raised beams to lock the truck to the platform for running movement.

5. The combination with a tractor and a trailer pivotally connected thereto of a truck removably mounted at the rear end of the platform, means on the truck to engage the platform at the rear end thereof, and means on the tractor for operating the means on the truck for simultaneously raising the rear end of the platform and pulling the platform and truck toward each other.

6. The combination with a platform pivotally mounted at the forward end and adapted to be raised or lowered at the rear end, a four-wheeled truck adapted to stand behind the platform and having a pair of fore-and-aft beams carrying the wheel axles of the truck, a rockable frame pivoted to said beams, said frame having at its forward end a slidable connection with the platform, and a cable winding mechanism connected to the rockable frame and connected with the platform forwardly of the connection to the rockable frame to rock the frame and raise the platform into running position and draw the truck and platform together.

7. A truck adapted to engage and lift a raisable platform, said truck comprising four wheels having their centers at the four corners of a rectangle, a pair of fore-and-aft beams, each carrying axles for two wheels, a transverse shaft mounted in said beams, a rocking frame mounted on said shaft whereby its end may be dipped down to a position adjacent the ground or elevated, and laterally spaced shoulders on the rocking frame adapted to slidably engage the platform, and mechanism for rocking the frame.

8. The combination of a trailer platform pivotally mounted at the forward end and free at the rear end to be raised or lowered, a removable truck behind the platform adapted to coact therewith, a rockable frame on the truck, the platform having fixed guideways open lengthwise and open at the rear and the rockable frame having at its forward end laterally spaced shoulders for slidably and pivotally engaging the guideways, said shoulders and guideways being adapted to be brought into engagement when the rear end of the platform is resting on the ground, and mechanism for raising the rear end of the platform and allowing the shoulders on the frame to slide along the guideways.

9. The combination of a tractor, a trailer platform behind the tractor and having its front end supported thereby, a wheeled truck behind the platform and supporting the rear end thereof, said platform having its top in a single plane from end to end, and means for lowering either end of the platform to the ground while the other end thereof is supported by the wheeled vehicle beyond the same, the vehicle at the other end being removable, whereby a load may be moved onto the platform from either end.

10. The combination of a tractor, a trailer platform behind the tractor unobstructed at each end, a bracket removably secured to the platform and engaging the tractor for supporting the front end of the platform, a wheeled truck behind the platform and detachably connected thereto for supporting the rear end thereof, whereby either end of the platform may be lowered to the ground to be loaded from that end, while the other end thereof is supported by the wheeled vehicle beyond the same, a power mechanism on the tractor, and mechanism operated thereto to raise either end of the platform.

11. The combination of a tractor, a trailer platform behind the tractor and supported thereby at the front end, a wheeled truck behind the platform and supporting the rear end thereof, the support at each end being such that either end of the platform may be lowered to the ground while the other end thereof is supported by the wheeled vehicle beyond the same, a power winch on the tractor, raising mechanism on the truck, and a cable leading from the winch and adapted to act interchangeably on the forward end of the platform or on said raising mechanism on the truck.

HERMAN J. TROCHE.
JAMES H. HOLAN, Jr.